(12) United States Patent
Mantese et al.

(10) Patent No.: US 10,823,619 B2
(45) Date of Patent: Nov. 3, 2020

(54) PYROELECTRIC DETECTOR SYSTEM

(71) Applicant: Carrier Corporation, Palm Beach Gardens, FL (US)

(72) Inventors: Joseph V. Mantese, Elllington, CT (US); Alan Matthew Finn, Hebron, CT (US); Ziyou Xiong, Wethersfield, CT (US); Nicholas Charles Soldner, East Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 235 days.

(21) Appl. No.: 16/069,184

(22) PCT Filed: Jan. 11, 2017

(86) PCT No.: PCT/US2017/012913
§ 371 (c)(1),
(2) Date: Jul. 11, 2018

(87) PCT Pub. No.: WO2017/123571
PCT Pub. Date: Jul. 20, 2017

(65) Prior Publication Data
US 2019/0033139 A1    Jan. 31, 2019

Related U.S. Application Data

(60) Provisional application No. 62/277,292, filed on Jan. 11, 2016.

(51) Int. Cl.
*G01J 5/00* (2006.01)
*G01J 5/34* (2006.01)
(Continued)

(52) U.S. Cl.
CPC .............. *G01J 5/34* (2013.01); *F24F 11/30* (2018.01); *G01J 5/0025* (2013.01); *G01J 5/025* (2013.01);
(Continued)

(58) Field of Classification Search
CPC . G01J 5/34; G01J 5/025; G01J 5/0025; G08B 13/191; F24F 11/30; F24F 2120/10; G01S 13/56; Y10S 250/01
See application file for complete search history.

(56) References Cited

U.S. PATENT DOCUMENTS 4,270,060 A    5/1981  Pines et al.
4,700,629 A  * 10/1987 Benson ................ F42B 3/113
                                                                 102/201
(Continued)

FOREIGN PATENT DOCUMENTS

WO    2015195417 A1    12/2015

OTHER PUBLICATIONS

Watton et al., "Performance of a thermal imager employing a hybrid pyroelectric detector array with mosfet readout," 1987, Proceedings of SPIE, vol. 865, pp. 78-85. (Year: 1987).*

(Continued)

*Primary Examiner* — Kiho Kim
(74) *Attorney, Agent, or Firm* — Cantor Colburn LLP

(57) ABSTRACT

A pyroelectric detector (20) includes a focal plane array (22) having a plurality of image sensors configured to convert electromagnetic energy into an electrical signal, and a memory module (24) coupled to the focal plane array. The focal plane array and the memory module are positioned on a common substrate platform (62).

9 Claims, 2 Drawing Sheets

(51) Int. Cl.
*G01J 5/02* (2006.01)
*G08B 13/191* (2006.01)
*F24F 11/30* (2018.01)
*G01S 13/56* (2006.01)
*F24F 120/10* (2018.01)

(52) U.S. Cl.
CPC ............ *G01S 13/56* (2013.01); *G08B 13/191* (2013.01); *F24F 2120/10* (2018.01); *Y10S 250/01* (2013.01)

(56) References Cited

U.S. PATENT DOCUMENTS

| | | | |
|---|---|---|---|
| 5,446,285 A * | 8/1995 | Choi | G08B 13/193 250/338.2 |
| 5,449,907 A | 9/1995 | McKeeman et al. | |
| 5,541,654 A | 7/1996 | Roberts | |
| 5,563,405 A | 10/1996 | Woolaway, II et al. | |
| 5,665,959 A | 9/1997 | Fossum et al. | |
| 6,069,351 A | 5/2000 | Mack | |
| 6,274,869 B1 | 8/2001 | Butler | |
| 7,030,356 B2 | 4/2006 | Pain et al. | |
| 7,795,859 B1 | 9/2010 | Lynch et al. | |
| 8,605,853 B2 | 12/2013 | Schultz et al. | |
| 8,687,086 B1 | 4/2014 | Campbell et al. | |
| 8,692,176 B2 | 4/2014 | Kelly et al. | |
| 8,829,409 B2 | 9/2014 | Wadsworth | |
| 9,118,850 B2 | 8/2015 | Luo et al. | |
| 2004/0212678 A1 * | 10/2004 | Cooper | G08B 13/19695 348/155 |
| 2012/0242820 A1 * | 9/2012 | Hanna | G06K 9/00597 348/78 |
| 2017/0112376 A1 * | 4/2017 | Gill | H04N 7/181 |

OTHER PUBLICATIONS

Simoni, A. et al. "A single-chip optical sensor with analog memory for motion detection", IEEE Journal of Solid-State Circuits, Jul. 1995, vol. 30, Issue: 7, 2 Pages, Abstract Only.

International Search Report from the International Searching Authority for International Application No. PCT/US2017/012913, Date of Completion: Mar. 20, 2017, dated May 23, 2017, 8 Pages.

Written Opinion from the International Searching Authority for International Application No. PCT/US2017/012913, International Filing Date: Jan. 11, 2017, dated May 23, 2017, 11 Pages.

"Low power consumption infrared thermal sensor array for smart detection and thermal imaging applications", P. Robert et al., DOI 10.5162/irs2013/i2.1, AMA Conferences 2013—Sensor 2013, OPTO 2013, IRS2 2013, 4 Pages.

A BiCMOS W-Band 2x2 Focal-Plane Array With On-Chip Antenna, Zhiming Chen, et al., IEEE Journal of Solid-State Circuits, vol. 47, No. 10, Oct. 2012, 17 Pages.

J. Fernández-Berni, R. Carmona-Galan, G. Liñán-Cembrano, A. Zarandy and A. Rodriguez-Vázquez, "Wi-FLIP: A wireless smart camera based on a focal-plane low-power image processor," 2011 Fifth ACM/IEEE International Conference on Distributed Smart Cameras, Ghent, 2011, 6 Pages.

Schultz, Dr. Kenneth I. and Dr. Michael W. Kelly, "Digital Focal-Plane Arrays", 2010 R&D 100, Tech Notes, Lincoln Laboratory, Massachusetts Institute of Technology, 2 Pages.

* cited by examiner

PYROELECTRIC DETECTOR SYSTEM

CROSS REFERENCE TO RELATED APPLICATIONS

This application is a National Stage application of PCT/US2017/012913, filed Jan. 11, 2017, which claims the benefit of U.S. Provisional Application No. 62/277,292, filed Jan. 11, 2016, both of which are incorporated by reference in their entirety herein.

BACKGROUND

The present disclosure relates to a pyroelectric detector and, more particularly, to an infrared focal plane array detector.

Pyroelectric detectors used for intrusion and presence detection have been typically limited to pixel counts of about four-by-four (4×4) pixels to stay reasonable in terms of cost and performance. Even with advances in MEMS, the pixel counts often remain less than approximately one-hundred by one-hundred (100×100) pixels. The manufacturing process for these low cost detectors does not scale well in terms of cost as pixel count increases. Additionally, the physical size of a pyroelectric array is large compared to the same pixel count for, as one example, complementary metal oxide silicon (CMOS) visible sensors because of the longer wavelength. The large physical size leads to higher costs due to decreased yields. As such, one-by-one to four-by-four (1×1 to 4×4) pyroelectric pixels are commonplace as, for example, occupancy detectors. In larger sizes, such as one-hundred by one-hundred (100×100) pixels, counting becomes possible, but the costs become prohibitive. Furthermore, energy consumption of infrared focal plane arrays becomes large for arrays having sufficient pixels to meet fidelity needs when supporting other systems such as HVAC and lighting. Alternative, cost effective, methods are desirable to, for example, perform occupancy detection and people counting with improved fidelity and reduced energy consumption.

SUMMARY

A pyroelectric detector system according to one, non-limiting, embodiment of the present disclosure includes a substrate platform; a focal plane array integrated into the substrate platform, the focal plane array including a plurality of image sensors configured to convert electromagnetic radiation into an electrical signal; and a memory module integrated into the substrate platform and coupled to the focal plane array.

Additionally to the foregoing embodiment, the substrate platform is silicon based.

In the alternative or additionally thereto, in the foregoing embodiment, the pyroelectric detector system includes a processor integrated into the substrate platform and coupled to the focal plane array and the memory module.

In the alternative or additionally thereto, in the foregoing embodiment, the pyroelectric detector system includes a signal conditioning module integrated into the substrate platform and coupled to the focal plane array and the memory module.

In the alternative or additionally thereto, in the foregoing embodiment, the pyroelectric detector system includes a wireless communication module integrated into the substrate platform and coupled to the focal plane array and the memory module.

In the alternative or additionally thereto, in the foregoing embodiment, the memory module comprises a ferroelectric random access memory.

In the alternative or additionally thereto, in the foregoing embodiment, the focal plane array comprises an infrared focal plane array.

In the alternative or additionally thereto, in the foregoing embodiment, the infrared focal plane array is configured to measure radiated energy having a wavelength within a range of about seven to fifteen micrometers.

In the alternative or additionally thereto, in the foregoing embodiment, the pyroelectric detector system includes a processor, a signal conditioning module and a wireless communication module integrated into the substrate platform and coupled to the focal plane array and the memory module.

In the alternative or additionally thereto, in the foregoing embodiment, the memory module comprises a ferro-electric random access memory.

In the alternative or additionally thereto, in the foregoing embodiment, the pyroelectric detector system includes at least one of a power acquisition device and a power storage device.

In the alternative or additionally thereto, in the foregoing embodiment, the power acquisition device comprises at least one of a solar power harvester, a thermal power harvester, an acoustic power harvester, and a vibration power harvester.

In the alternative or additionally thereto, in the foregoing embodiment, the power storage device comprises at least one of a chemical battery, a flow battery, a mechanical energy storage device, a thermal storage device, and a capacitor.

A method of operating a pyroelectric detector system for at least one of presence detection of a human, detection of a hot object, and counting of humans, according to another, non-limiting, embodiment includes operating a focal plane array in a sleep mode utilizing a first excitation current, and wherein the focal plane array, a memory module and a processor are mounted on a common substrate platform; sensing gross motion by the focal plane array; and operating the focal plane array in a full capability mode at a second excitation current that is greater than the first excitation current.

Additionally to the foregoing embodiment, the focal plane array includes a plurality of infrared sensors with a portion of the plurality of infrared sensors being active when in the sleep mode and all of the infrared sensors being active when in the full capability mode.

In the alternative or additionally thereto, in the foregoing embodiment, the method includes managing the acquisition of energy from a power acquisition device.

In the alternative or additionally thereto, in the foregoing embodiment, the method includes managing the dissipation of energy from a power storage device.

In the alternative or additionally thereto, in the foregoing embodiment, sensing the gross motion is conducted through the generation of an image derived from thermal variations due to the motion.

In the alternative or additionally thereto, in the foregoing embodiment, at least a portion of the plurality of infrared sensors are passive infrared intrusion sensors.

The foregoing features and elements may be combined in various combinations without exclusivity, unless expressly indicated otherwise. These features and elements as well as the operation thereof will become more apparent in light of the following description and the accompanying drawings.

However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
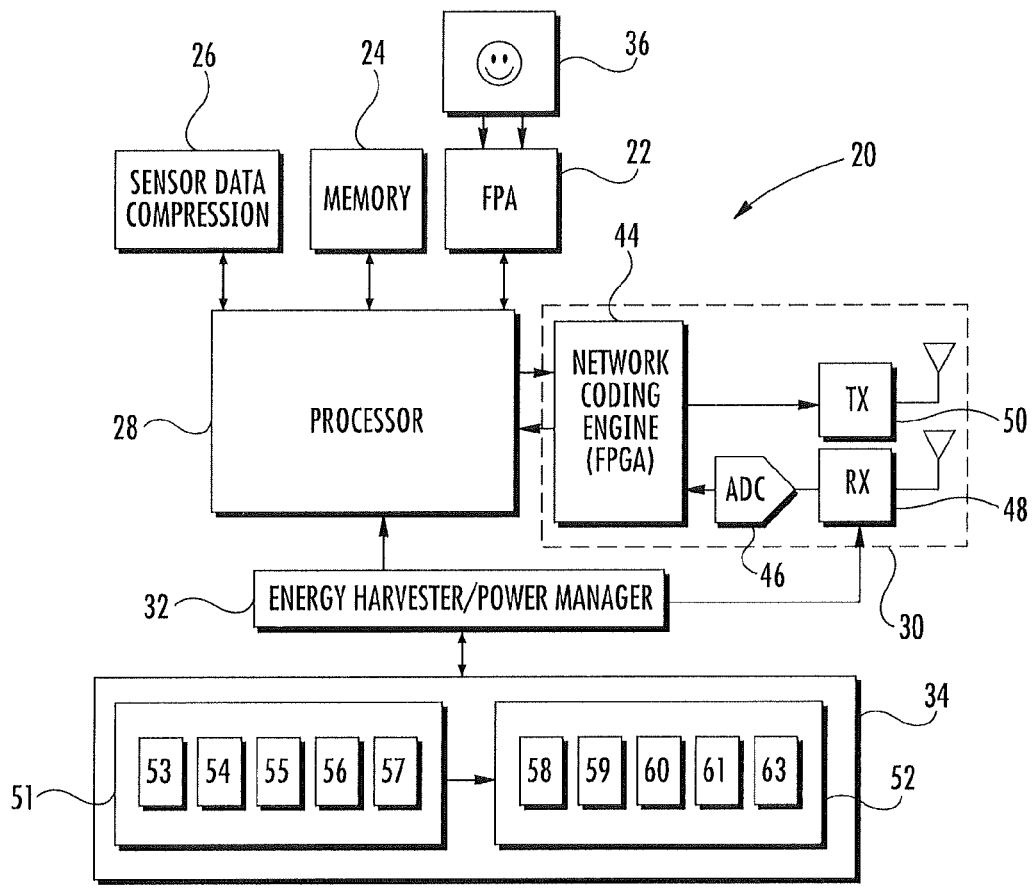
FIG. 1 is a schematic of a pyroelectric detector system as one, non-limiting, exemplary embodiment of the present disclosure.

Referring to FIG. 1, an exemplary embodiment of a detector system 20 that may be a pyroelectric detector system is illustrated. As one, non-limiting, example, the detector system 20 may facilitate the detection of occupancy and/or perform people counting in a given space. The detection system 20 may include a focal plane array (FPA) 22, a memory module 24, an optional sensor data compression block 26, a processor 28, a communication module 30, a power management module 32, and at least one power source 34.

Figure 2:
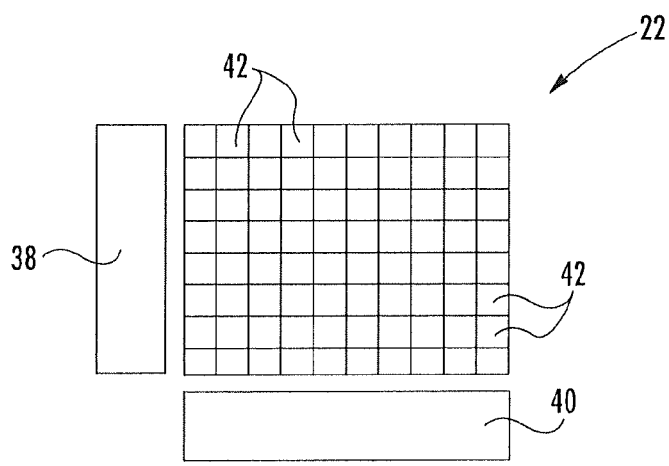
FIG. 2 is a schematic of a focal plane array of the pyroelectric detector system.

Referring to FIGS. 1 and 2, the FPA 22 may be an infrared focal plane array configured to sense and detect radiated heat emitted by objects 36 (e.g., person(s)) occupying a predefined space. The FPA 22 includes a row decoder 38, a column decoder 40, which are part of the Read-Out Integrated Circuit (ROIC), and a plurality of sensors 42 that may be infrared sensors arranged in a series of rows and columns (i.e., six rows and nine columns illustrated in FIG. 2). The row and column decoders 38, 40 are electrically coupled to the respective rows and columns of sensors 42, and are configured to receive intensity information (e.g., heat intensity) recorded over a time interval. As one example, the sensors 42 may be configured to sense radiated energy having a long infrared wavelength that may be within a range of about seven (7) to fifteen (15) micrometers. This range is a thermal imaging region, in which the sensors 48 may obtain a passive image of objects (e.g., the human body) only slightly higher than, for example, room temperature. This image may be based on thermal emissions only and requires no visible illumination.

The memory module 24 is generally a computer readable and writable storage media and is configured to communicate with the processor 28 and generally stores intensity data from the FPA 22 for later processing and stores executable programs and their associated permanent data as well as intermediate data from their computation. The memory module may be a random-access memory (RAM) that may be a ferroelectric RAM (FRAM) having relatively low power consumption with relatively fast write performance, and a high number of write-erase cycles. Other examples of a RAM may include a dynamic RAM (DRAM), and a non-volatile RAM (NVRAM) also called flash memory.

The image intensity information received by the decoders 38, 40 may be conditioned via a signal conditioning circuit (not shown) that is also part of the ROIC and then sent to the processor 28. Signal conditioning may include analog-to-digital converters and other circuitry to compensate for noise that may be introduced by the sensors 42. The processor 28 may be configured to provide focal plane scaling of the intensity value data received from the signal condition circuit and may further provide interpolation techniques generally known in the art. The processor 28 is generally computer-based and examples may include a post-processor, a microprocessor and/or a digital signal processor.

The communication module 30 is configured to send and receive information and commands relative to the operation of the detector system 20. The communication module 30 may include a network coding engine block 44, an ADC 46, a receiver 48 (e.g. wireless), a transmitter 50 (e.g., wireless). The transmitter 50 may contain a DAC, power amplifiers, filters, impedance matching devices, and others (not shown), but is well known to one skilled in the art. Also, as is well-known in the art, the transmitter and receiver may be implemented as a transceiver or could be replaced by a well-known wired communication link (not shown). The network coding engine block 44 is configured to interface the input and output of processor 28 to the transmitter 50 and the receiver 48 (i.e., through ADC 46), and provide encoding or decoding (e.g., for error detection and correction, security via encryption, authentication, and others). The functions of communication module 30 may be affected, in total or in-part, by processor 28 that may include hardware and software to enable such functions.

The ADC 46 is configured to convert analog received information to digital information for eventual use by processor 28. The ADC 46 may be implemented as part of the receiver 48 as is known by one skilled in the art. Network Coding Engine 44 provides any decoding necessary for error detection and correction, or security.

The receiver 48 is configured to receive wireless communication from other systems such as an HVAC control system, a security monitoring system, a transportation system, a building management system, or others, which provides functions that depend on the presence detection provided by detection system 20.

The transmitter 50 is configured to send wireless communication to other systems such as an HVAC control system, a security monitoring system, a transportation system, a building management system, or others, which provides functions that depend on the presence detection provided by detection system 20.

The power management module 32 is configured to control the power acquisition and power consumption of detection system 20 by controlling both the power source(s) 34, and power consuming devices (e.g., processor 28, optional data compression 26, memory 24, FPA 22, and communication module 30 that includes network coding engine 44, transmitter 50, receiver 48, and ADC 46). Similarly other energy consuming parts of detector system 20 (not shown) may be controlled. The control consists of simultaneously maintaining detector system 20 functionality while maximizing life (i.e., the length of time detector system 20 can remain functional). In one embodiment, this control is achieved by receding horizon control (optimization). In alternative embodiments, other control strategies such as model predictive control, fixed schedules, and others may be used.

The power source(s) 34 may include at least one power acquisition device 51 and/or at least one power storage device 52. The power acquisition devices 51 may be configured to power components of the detector system 20 (e.g., FPA 22) directly and/or may be configured to recharge the at least one power storage device 52. The power acquisition devices 51 may include at least one of a solar power harvester 53, a thermal power harvester 54, an acoustic power harvester 55, a vibration power harvester 56, and a power grid 57 that may be a public utility power grid. The at least one power storage device 52 may include at least one of a chemical battery 58, a flow battery 59, a mechanical energy storage device 60, a thermal storage device 61, and a capacitor 63. It is contemplated and understood that other power acquisition and storage devices 51, 52 may be applicable.

The power management module 32 is configured to draw power from any one of the power sources 34, or exchange power between the power sources, as dictated by the needs of the system. The power management module 32 may also facilitate a power scheduling function that controls the simultaneous use of the various on-chip component functions to minimize unwanted current spikes. The power management module 32 may also issue commands to the focal plane array 22 to turn off and/or turn on various sensors of the FPA 22 or place the ROIC (comprising the pyroelectric FPA 22) in a quiescent low power state. This "sleep" or low power consumption modes will enable the detector system 20 to minimize power consumption when not required. In particular, the power consumption of processor 28 and memory 24 may be controlled by power management module 32 reducing the clock rate.

The pyroelectric FPA 22 may also be operated without the use of an on-chip or external temperature reference as provided by a chopper. In this mode of operation, only motion is captured through the generation of an image derived from thermal variations due to motion. Such a mode of operation may be used to further reduce power consumption.

Figure 3:
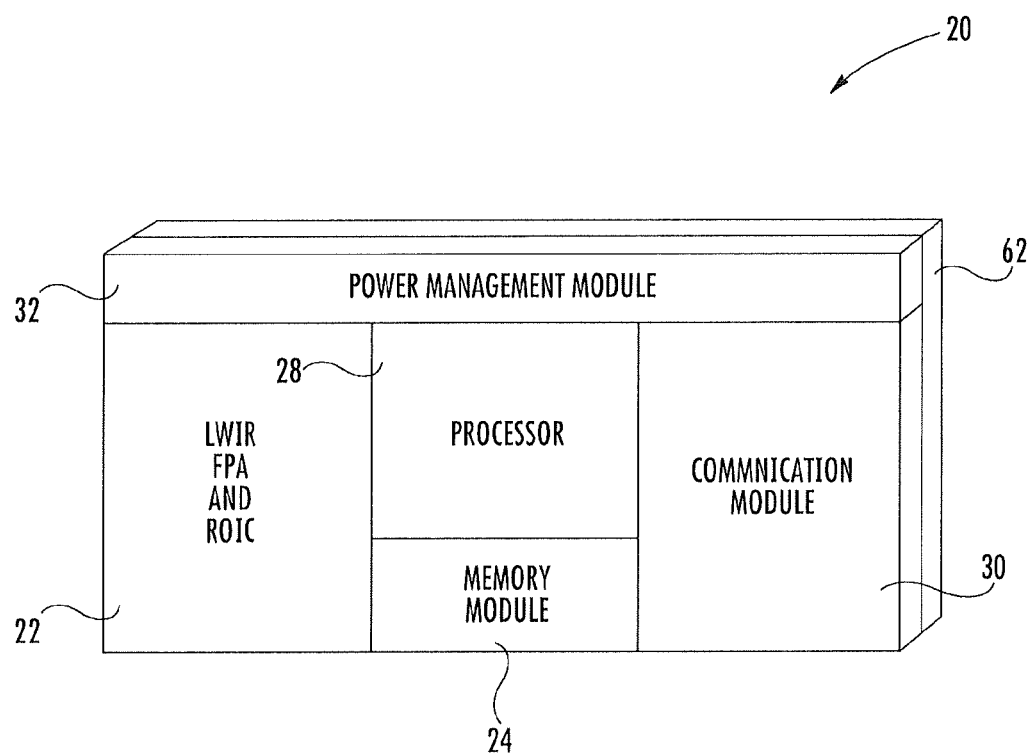
FIG. 3 is a perspective view of components of the pyroelectric detector system integrated into a common substrate platform.

Referring to FIG. 3, the FPA 22 including the ROIC, the memory module 24, the processor 28, the power management module 32, and the communication module 30 may generally be integrated together on a single substrate platform or chip 62 that may be silicon-based. More specifically, the components may generally share the focal plane of the FPA 22. Together, the integrated components may be aimed toward minimal power consumption, small overall size/weight and low cost. Integration of these components may be further enhanced via a power scheduling function conducted by the power management module 32 as well as coordinated design of the individual functions of each component to work harmoniously. That is, the power scheduling function may, for example, minimize unwanted current spikes by controlling the simultaneous use of the various on-chip components functions.

For example, during operation the integrated components of the detector 20 may be configured to transition to a sleep mode when there is no active movement in the field of view. More specifically and until movement is detected, the detector 20 may operate with only a limited excitation current (e.g., nano amperage), with only a few sensors 42 being turned on to detect gross motion. Once gross motion is detected, and/or by receiving a wireless trigger signal to wake via the receiver 48 of the communication module 30, the detector 20 may be made to transition to a full capability mode, or conversely, may be wirelessly commanded to a low level power safe/consumption mode. Alternatively, the detector 20 may automatically transition into the sleep mode in the event of non-movement or an unchanged occupancy or presence state.

By placing individual subsystem components on the same die or chip, signal integrity, resistive losses and security is generally improved through elimination of interconnects and sources of extraneous electrical and radiative noise typically present in systems with similar functionality but that use several individually packaged integrated circuits (IC's). Moreover, by placing all components on the same substrate platform, economy of scale is achieved that enables chip-scale cost reduction. Yet further, power consumption may be optimized potentially achieving long life battery operation.

Other benefits of the present disclosure include a detector 20 that is suited for intrusion detection, and that may respond only to motion and therefor may inherently select motion-based intrusion as opposed to steady state hot objects. Moreover, the detector may offer only enough resolution and sensitivity to count persons, and therefore will not create invasion of privacy concerns. The detector system 20 may be built upon a ferroelectric memory platform using either active or passive detection (e.g., passive infrared intrusion sensors); and, may be built upon a thermal isolator rather than a MEMS bridge, thereby improving yield, reducing across device response variations, and may be compatible with wafer production having small feature sizes.

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A pyroelectric detector system comprising:
   a substrate platform;
   a focal plane array integrated into the substrate platform, the focal plane array including a plurality of image sensors configured to convert electromagnetic radiation into an electrical signal;
   a memory module integrated into the substrate platform and coupled to the focal plane array;
   a processor integrated into the substrate platform and coupled to the focal plane array and the memory module;
   a signal conditioning module integrated into the substrate platform and coupled to the focal plane array and the memory module;
   a wireless communication module integrated into the substrate platform and coupled to the focal plane array and the memory module; and
   a power management module integrated into the substrate platform and coupled to the processor, the power management module configured to perform a power scheduling function relative to power draw from the focal plane array, the signal conditioning module, the wireless communication module, and the memory module to minimize current spikes.

2. The pyroelectric detector system set forth in claim 1, wherein the substrate platform is silicon based.

3. The pyroelectric detector system set forth in claim 1, wherein the memory module comprises a ferroelectric random access memory.

4. The pyroelectric detector system set forth in claim 1, wherein the focal plane array comprises an infrared focal plane array.

5. The pyroelectric detector system set forth in claim 4, wherein the infrared focal plane array is configured to measure radiated energy having a wavelength within a range of about seven to fifteen micrometers.

6. The pyroelectric detector system set forth in claim 1, wherein the memory module comprises a ferro-electric random access memory.

7. The pyroelectric detector system set forth in claim 1 further comprising:
   at least one of a power acquisition device and a power storage device.

8. The pyroelectric detector system set forth in claim 7, wherein the power acquisition device comprises at least one of a solar power harvester, a thermal power harvester, an acoustic power harvester, and a vibration power harvester.

9. The pyroelectric detector system set forth in claim 7, wherein the power storage device comprises at least one of a chemical battery, a flow battery, a mechanical energy storage device, a thermal storage device, and a capacitor.

* * * * *